United States Patent
Truong et al.

(10) Patent No.: US 10,512,054 B2
(45) Date of Patent: Dec. 17, 2019

(54) SYNCHRONIZATION AND TIME TRANSFER IN WIRELESS NETWORKS AND METHOD THEREFOR

(71) Applicant: BENCHMARK ELECTRONICS, INC., Scottsdale, AZ (US)

(72) Inventors: Hiep Truong, Scottsdale, AZ (US); Kevin Nguyen, Scottsdale, AZ (US)

(73) Assignee: BENCHMARK ELECTRONICS, INC., Tempe, AZ (US)

( * ) Notice: Subject to any disclaimer, the term of this patent is extended or adjusted under 35 U.S.C. 154(b) by 0 days.

(21) Appl. No.: 15/982,734

(22) Filed: May 17, 2018

(65) Prior Publication Data

US 2019/0357164 A1   Nov. 21, 2019

Related U.S. Application Data

(60) Provisional application No. 62/577,566, filed on Oct. 26, 2017.

(51) Int. Cl.
*H04W 56/00* (2009.01)
*H04W 24/10* (2009.01)

(52) U.S. Cl.
CPC ....... *H04W 56/0015* (2013.01); *H04W 24/10* (2013.01)

(58) Field of Classification Search
CPC .............. H04L 7/0008; H04W 16/18; H04W 52/0206; H04W 56/002; H04W 64/00; H04W 64/003; H04W 72/0446
See application file for complete search history.

(56) References Cited

U.S. PATENT DOCUMENTS

| 6,542,754 | B1 | 4/2003 | Sayers et al. |
| 6,560,210 | B1* | 5/2003 | Matusevich ...... H04W 36/0072 370/331 |
| 2005/0141478 | A1 | 6/2005 | Ho |
| 2007/0184864 | A1* | 8/2007 | Leitch ............... H04W 56/0015 455/507 |
| 2011/0216660 | A1 | 9/2011 | Lee et al. |
| 2011/0293023 | A1 | 12/2011 | Wu et al. |
| 2013/0070751 | A1 | 3/2013 | Atwal et al. |

(Continued)

FOREIGN PATENT DOCUMENTS

| CN | 105682216 | 6/2016 |
| CN | 106455042 | 2/2017 |

(Continued)

OTHER PUBLICATIONS

Sandner et al., "A 3GHz to 7GHz Fast-Hopping Frequency Synthesizer for UWB", 2004.*

(Continued)

*Primary Examiner* — Ayaz R Sheikh
*Assistant Examiner* — Debebe A Asefa
(74) *Attorney, Agent, or Firm* — Weiss & Moy, P.C.; Jeffrey D. Moy

(57) ABSTRACT

A method for synchronization and time transfer in a wireless system having a single timing source comprises: transmitting a timing message from a coordinator node, wherein the coordinator node is coupled to the single timing source of the wireless system; detecting the timing message by a wireless node; and synchronizing the wireless node to a time on the timing message.

17 Claims, 4 Drawing Sheets

(56) References Cited

U.S. PATENT DOCUMENTS

2013/0138826 A1   5/2013  Ling et al.
2015/0016130 A1   1/2015  Davis et al.
2015/0106647 A1   4/2015  Ish-Am

FOREIGN PATENT DOCUMENTS

CN    106572183      4/2017
WO    2015143464    10/2015

OTHER PUBLICATIONS

Clock Synchronization in Wireless Sensor Networks: An Overview III—Keun Rhee, Jaehan Lee, Jangsub Kim, Erchin Serpedin, and Yik-Chung Wu Sensors 2009, 9, 56-85; doi:10.3390/s90100056; ISSN 1424-8220 Source: file://gps-dfs-p-01/RDS/sampoorna.patti/Downloads/sensors-09-00056.pdf Publication Date: Jan. 6, 2009.

* cited by examiner

SYNCHRONIZATION AND TIME TRANSFER IN WIRELESS NETWORKS AND METHOD THEREFOR

RELATED APPLICATIONS

This patent application is related to U.S. Provisional Application Ser. No. 62/577,566 filed Oct. 26, 2017, entitled "INTERNET OF THINGS (IOT) ARCHITECTURE" in the name of Hiep Truong, Kevin Nguyen, Ron Hobbs, and Jim Luecke, and which is incorporated herein by reference in its entirety. The present patent application claims the benefit under 35 U.S.C § 119(e).

The present application relates generally to the technical field of wireless networks, and more specifically, to the technical field of time synchronization in a wireless network system using RF ranging measurement and timing signal detection and time information extraction.

BACKGROUND

In wireless networks, there is no global clock. Each wireless system, or wireless node, has its own internal clock and its own notion of time. These clocks can easily drift anywhere from microseconds to seconds in a small duration of time, accumulating significant errors over time. These clock drifts potentially pose serious problems to applications that depend on a synchronized notion of time. For most applications and algorithms that run in a distributed wireless system, time information is needed. For example, in a distributed wireless system the time, time-of-day, etc. of when an event will happen on a wireless node in the network may be required. Also, the time interval between two events that happened on different wireless nodes in the network or the relative ordering of events that happened on different wireless nodes in the network may need to be known.

In ad-hoc wireless networks such as sensor networks, many applications may need for the local clocks of the sensor nodes to be synchronized, requiring various degree of precision to coordinate their operations and collaborate to achieve complex sensing tasks. Data fusion is an example of such coordination in which data collected at different nodes are aggregated into a meaningful result.

Furthermore, time alignment is critical for ensuring quality of service (QoS) for sensors network applications such as data, voice and video over a wireless access medium. As wireless networks evolve to packet switching, proper and precision time synchronization is needed for IP networks to achieve performance quality. Accurate time alignment (Time-transfer or time-of-day) is needed to support QoS and traffic engineering.

Therefore, it would be desirable to provide a system and method that overcomes the above.

SUMMARY

In accordance with one embodiment, a method for synchronization and time transfer in a wireless system having a single timing source is disclosed. The method comprises: transmitting a timing information from a coordinator node, wherein the coordinator node is coupled to the single timing source of the wireless system; detecting the timing information by a wireless node; and synchronizing the wireless node to a time on the timing information.

In accordance with one embodiment, a method for synchronization and time transfer in a wireless system having a single timing source is disclosed. The method comprises: transmitting timing messages at a predetermined time interval by a coordinator node, wherein a time between timing messages is defined as a frame time, the frame time comprising a plurality of time slots, wherein the plurality of time slots can be one of a same duration or varying duration, wherein the coordinator node is coupled to the single timing source; detecting a first valid timing message sent by the coordinator node by a wireless node remote from the coordinator node; and synchronizing the wireless node to a time on the valid timing message.

In accordance with one embodiment, a wireless node system is disclosed. The wireless node system has a coordinator node coupled to a single timing source of the wireless node system. The coordinator node transmits timing messages at a predetermined time interval, wherein a time between timing messages is defined as a frame time, the frame time comprising a plurality of time slots, each time slot being one of a same duration or varying durations, wherein the coordinator node is coupled to the single timing source. A plurality of wireless nodes is in wireless communication with the coordinator node. Each of the plurality of wireless nodes detect a first valid timing message sent by the coordinator and synchronize to a time on the valid timing message.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The present disclosure relates to a system for wireless network system synchronization. The system may use a combination of wireless network system synchronization, precision RF ranging measurement, and timing signal detection and time information extraction to provide time transfer from one wireless node with timing information to multiple wireless nodes, without timing information.

Figure 1:
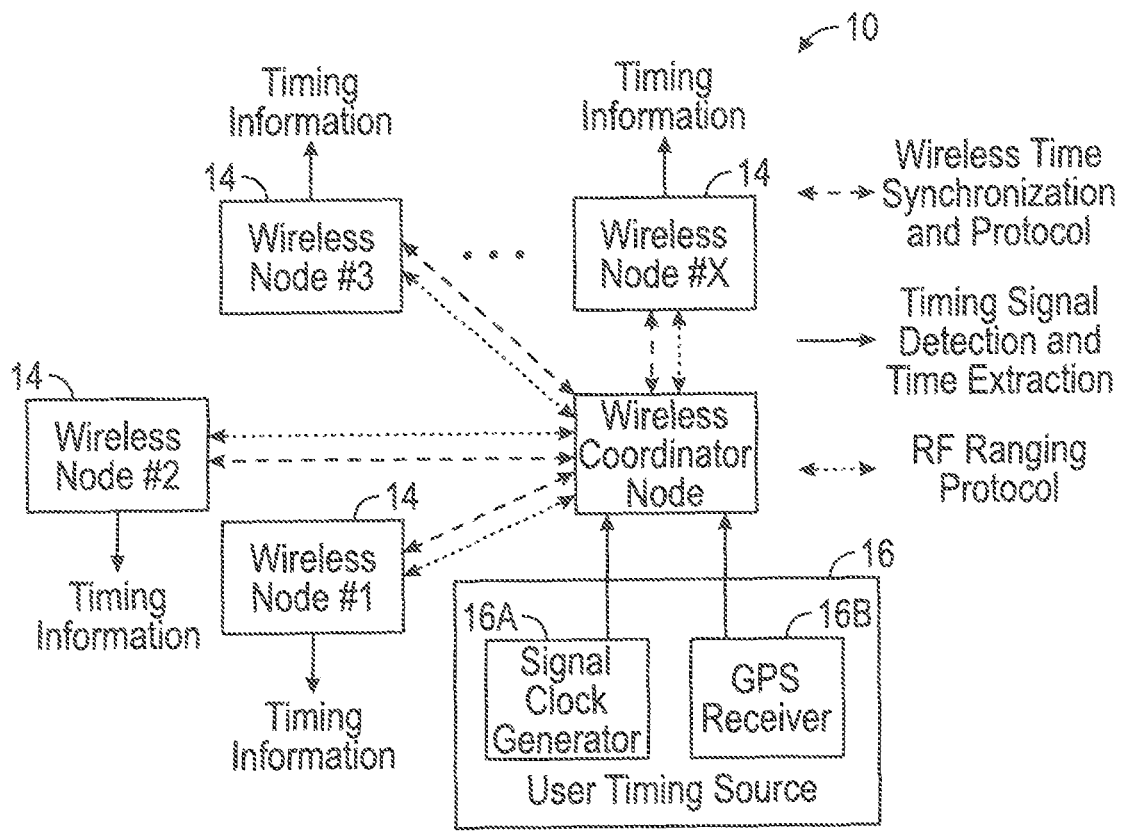
FIG. 1 is an exemplary block diagram of a synchronization and time transfer system in accordance with one aspect of the present application.

Referring to FIG. 1, a wireless network 10 may be seen. The wireless network 10 may be any wireless system having an access point and wireless devices wirelessly coupled to the access point. In the present embodiment, the wireless network 10 may be comprise of a coordinator node 12 and a plurality of wireless nodes 14. The wireless nodes 14 may be shown as wireless nodes #1-#X. The system 10 may be designed to minimize cost and power usage. To minimize cost and power usage, the wireless nodes 14 may be configured not to have any timing information. Thus, the wireless nodes 14 may be configured not to have an internal timing source such as a signal clock generator and/or GPS receiver. In accordance with one embodiment, the wireless nodes 14 may be wireless sensors which may monitor, record and/or transmit data.

The wireless network 10 may have a coordinator node 12. The coordinator node 12 may be wirelessly coupled to one or more of the wireless nodes 14. The coordinator mode 12 may be used to establish a local time for the system 10. The coordinator node 12 may do this by sending timing information as well as other data to one or more of the wireless nodes 14. In accordance with one embodiment, the coordinator mode 12 may transmit timing and/or data signals to the wireless nodes 14 in the UWB frequency range. For example, in the unlicensed frequency bands of 3 GHz to 7 GHz.

The coordinator node 12 may be coupled to a timing source 16. The timing source 16 may be a signal clock generator 16A, a GPS receiver 16B having Coordinated Universal Time (UTC) information and global synchronization and/or other global clock devices. The timing source 16 may be used to establish a local time for the system 10 by sending a clock signal to the coordinator node 12. The timing source 16 may send a timing message at predetermined intervals to the coordinator node 12. In accordance with one embodiment, the predetermined time period may be defined as frame time, Tf.

The coordinator node 12 may be wirelessly coupled to one or more of the wireless nodes 14. The coordinator node 12 may maintain the local time established by the timing source 16 by sending out the timing message with the time established by the timing source 16. The timing message may be used to establish a network timing reference for each of the wireless nodes 14 receiving the timing message. The wireless nodes 14 may synchronize with the coordinator node 12 by synchronizing to the time of the timing message. The wireless nodes 14 may calculating delay times and frame times as will be disclosed below to maintain synchronization. The wireless nodes 14 may transmit the above timing information to other wireless nodes not wirelessly coupled to the coordinator node 12 to synchronize these wireless nodes to the coordinator node 12. The system 10 may allow for the coordinator node 12 and wireless nodes 14 to remove over-the-air transport times to enhance network timing synchronization as also disclosed below.

Figure 2:
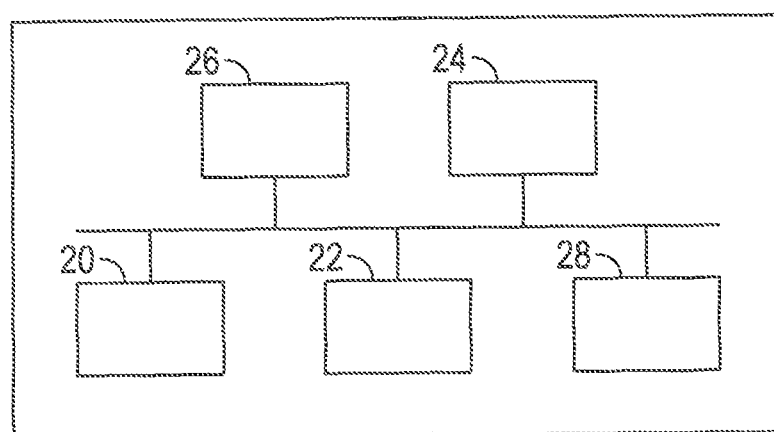
FIG. 2 is an exemplary block diagram of a wireless node used in the synchronization and time transfer system of FIG. 1 in accordance with one aspect of the present application.

Referring to FIG. 2, a block diagram of one embodiment of a wireless node 14 may be seen. The wireless node 14 may have a sensor 20. The sensor 20 may be used to collect sensory data. For example, the sensor 20 may be used to collect noise data, vibration data, pollutant data, and/or other external sensory data.

The wireless node 14 may have a receiver/transmitter 22. The receiver/transmitter 22 may be used to send and receive data to and from the wireless node 14. In accordance with one embodiment, the receiver/transmitter 22 may be an Ultra-Wideband (UWB) receiver/transmitter 22A. The UWB receiver/transmitter 22A may operate in the unlicensed frequency bands of 3 GHz to 7 GHz.

The wireless node 14 may have memory 24. The memory 24 may be used to store sensory data from the sensor 20. In some embodiments, sensory data could be transmitted elsewhere for storage via the receiver/transmitter 22. The memory 24 may also be used as a computer-readable storage medium containing instructions for synchronizing the wireless node 14 as will be described below. Such instructions can be executed by a processor 26. The wireless node 14 may be powered by a power source 28. The power source 28 may be a battery or similar device.

Figure 3:
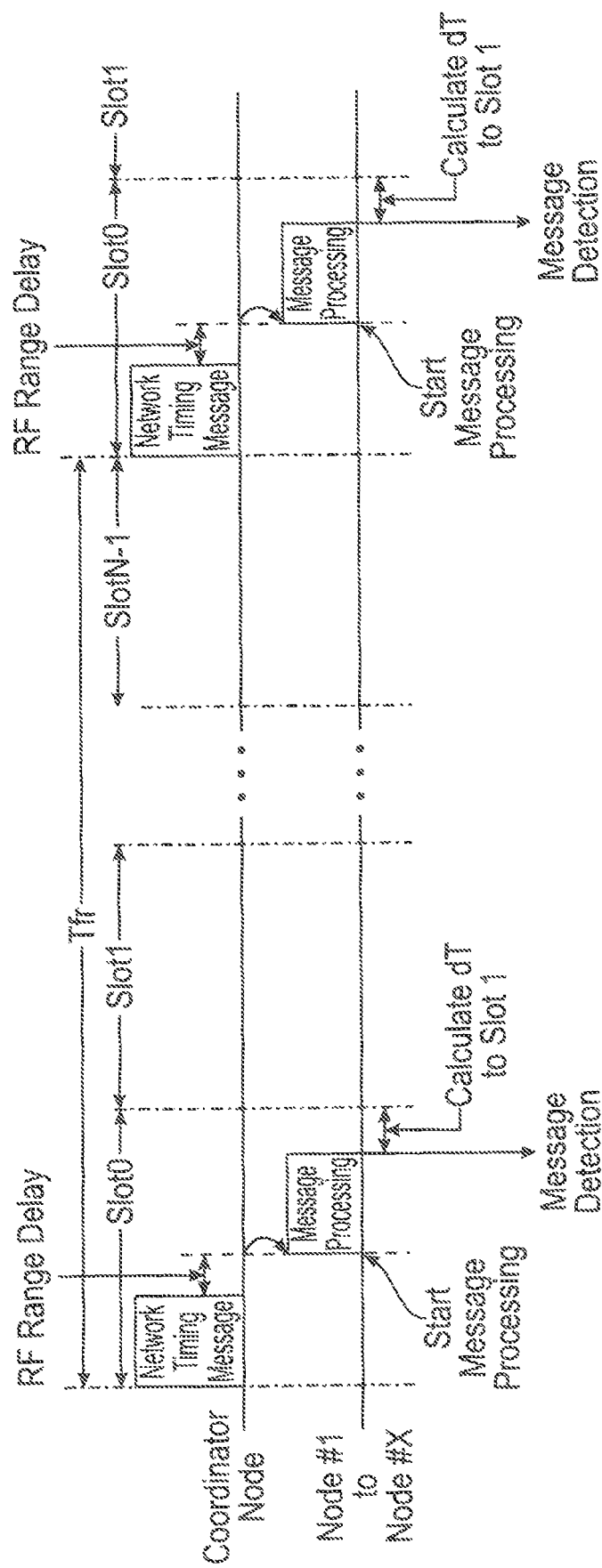
FIG. 3 is an exemplary timing diagram of the synchronization and time transfer system of FIG. 1 in accordance with one aspect of the present application.

Referring to FIGS. 1-3, a method of synchronization and time transfer for the system 10 may be disclosed. The method uses a combination of wireless network system synchronization, precision RF ranging measurement, and timing signal detection and time information extraction to provide time transfer from the coordinator node 12, having timing information to multiple wireless nodes 14, without timing information.

In accordance with one embodiment, since the wireless nodes 14 do not have a timing source, the wireless nodes 14 need to have some notion of time in order to operate. Thus, the wireless nodes 14 should be synchronized with the coordinator node 12 in order to have all of the components of the system 10 operating on the same system time. To synchronize the system 10, the coordinator node 12 may broadcast a timing message 30. The timing message 30 may establish a network timing reference. As may be seen in FIG. 3, the timing message may be sent at a beginning of time slot Slot 0. The coordinator node 12 may send another timing message 30 at a predetermined time period. This time between the timing messages 30 may be called the frame time, Tfr. Thus, as may be seen in FIG. 3, the frame time Tfr may be the time between when the first timing message 30 sent at time slot Slot 0 and when the second timing message 30 is sent at the end of time slot Slot N−1. The frame time, Tfr, may be divided into a plurality of slot time, Slot 0 . . . Slot N−1. Each of the slot times may be of an equal duration or can be valid.

Each wireless node 14 may search for the timing message 20 in order to discover the timing message 30 and to synchronize to the time of the coordinator node 14 sent on the timing message 30. When the wireless node 14 detects the message in the timing message 30, the wireless node 14 may synchronize to the time of the coordinator node 14 sent on the timing message 30. In order to maintain the local system time, the wireless node 14 may determine a delay time to the next slot time, Slot 1 in the present embodiment Once the delay time dT is determined, the wireless node 14 may then start to count to the next timing message 30. Since the coordinator node 12 will send a timing message 30 each frame time Tfr, the wireless node 14 will know when the next timing message 30 may be sent. By computing the delay time dT and knowing the frame time Tfr, the wireless node 14 may maintain the local system time and be synchronized with coordinator node 12.

To enhance the network timing synchronization, the system 10 should take into account the time differential between the time the coordinator node 12 transmits the timing message 30 and when the wireless node 14 starts processing the timing message 30. This time may be seen as the RF Range Delay in FIG. 3.

Upon the synchronization between the coordinator node 12 and the wireless node 14, the system 10 may enhance the network timing synchronization by removing the over-the-air transport time, RF Range Delay. To remove the over-the-air-transport time, the coordinator node 12 and the wireless nodes 14 may perform a ranging function to determine the time delay between the sending and receiving of data between wireless nodes. The wireless nodes may be the coordinator node 12 and the wireless nodes 14 and/or between two different wireless nodes 14. Ranging is a function to compute a distance between wireless nodes. In accordance with one embodiment, the system 10 may use a time-of-flight ranging technique.

Figure 4:
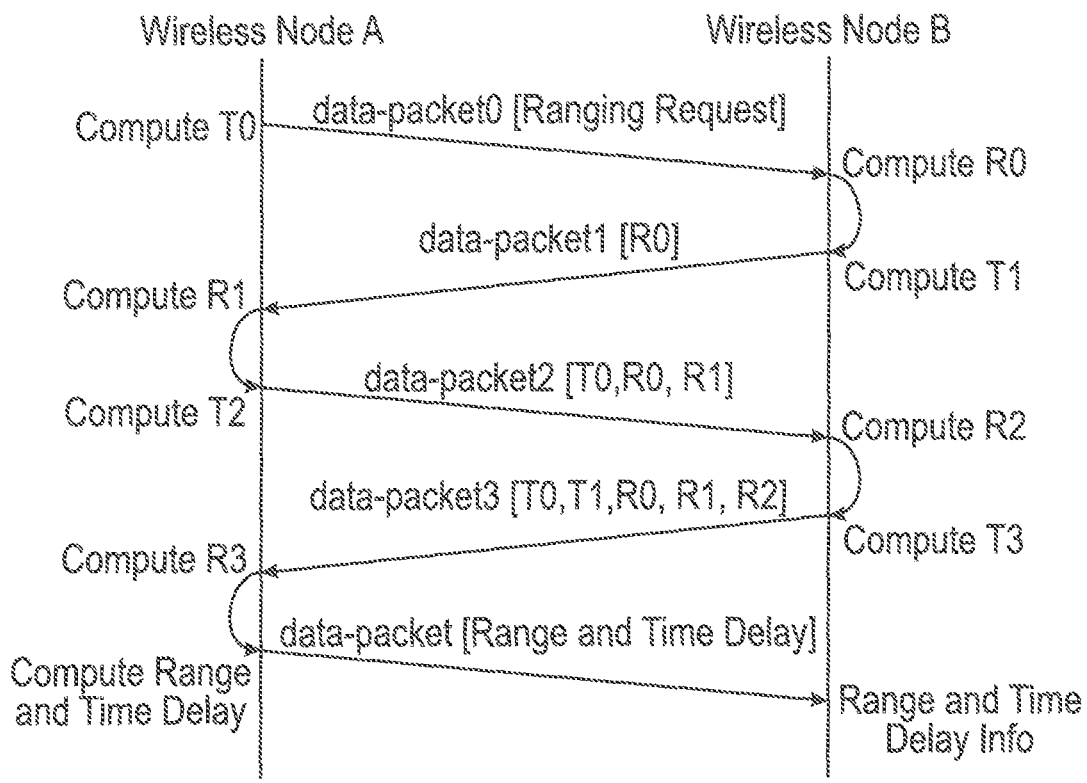
FIG. 4 is an exemplary timing diagram of the synchronization and time transfer system for determining a time delay in accordance with one aspect of the present application.

Referring to FIG. 4, the ranging between two wireless nodes, wireless Node A and wireless node B may be seen. It should be noted, that the ranging protocol is generally performed after the system 10 has been synchronized so that wireless node A and wireless node B are operating on the same system time. As stated above, the wireless nodes A and B may be the coordinator node 12 and a wireless node 14 and/or between two different wireless nodes 14. In accordance with one embodiment, wideband signals UWB from the wireless nodes A and B may be used to estimate (measure) the time it takes to send and receive signals from one another and multiplies it by the speed of RF propagation (c, the speed of light) to approximate the range between the wireless nodes A and B.

As shown in FIG. 4, wireless node A at time T0 may send a range request data package to wireless node B. Wireless node B records the time R0 when the range request data package has been received. Wireless node B then sends a data package with the time R0 to wireless node A at a recorded time T1. Wireless node A records the time R1 when the data package with the time R0 has been received. Wireless node A at recorded time T2 may send a data package with the time T0, R0, R1 to wireless node B. Wireless node B records the time R2 when the data package with the data package of the times T0, R0, R1 has been received. Wireless node B then sends a data package with the time T0, T1, R0, R1, R2 to wireless node A at a recorded time T3. Wireless node A records the time R3 when the data package with the times T0, R0, R1, R2 has been received. Wireless node A may compute the time delay using the formula below:

$$\text{Time Delay Between Node A and B} = \frac{\frac{(R1\text{-}T0)-(T1\text{-}R0)}{2} + \frac{(R2\text{-}T1)-(T2\text{-}R1)}{2}}{2}$$

Once the time delay has been calculated by wireless Node A, wireless Node A may send a data package with the time delay calculated to wireless node B.

Thus, if the wireless nodes 14 computes the time delay between the time the coordinator node 12 sends a timing message 30 and when the wireless node 14 begins to process the timing message 30, the wireless node 14 may removing this time delay, RF Range Delay, to more accurately approach the time of the coordinator node 12.

The ranging between wireless nodes may further be done to aid in the location of the wireless nodes 14. As shown in FIG. 1, the wireless nodes 14 generally may not have a GPS receiver 16B. However, if the coordinator node 12 is connected to the GPS receiver 16B and the location of the coordinator node 12 is known, the wireless node 14 may use triangulation between the wireless node 14 and the coordinator node 12 and the wireless node 14 and other wireless nodes 14 to determine a location of the different wireless nodes 14.

Figure 5A:
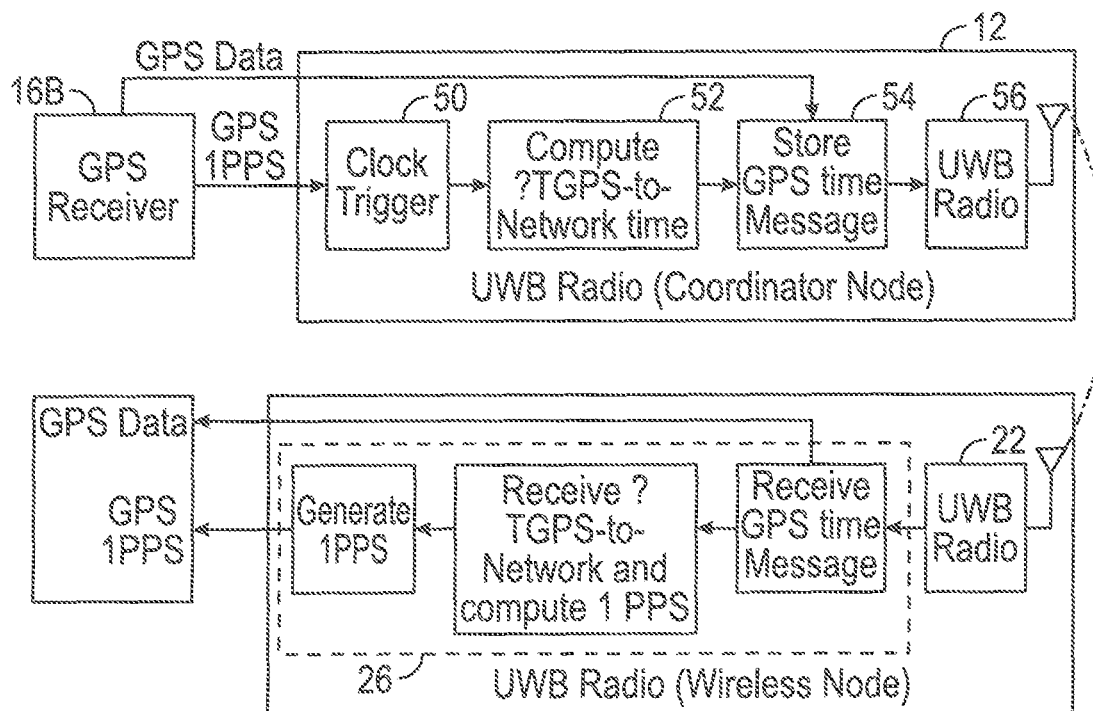
FIG. 5A is an exemplary block diagram of a synchronization and time transfer system in accordance with one aspect of the present application.
Figure 5B:
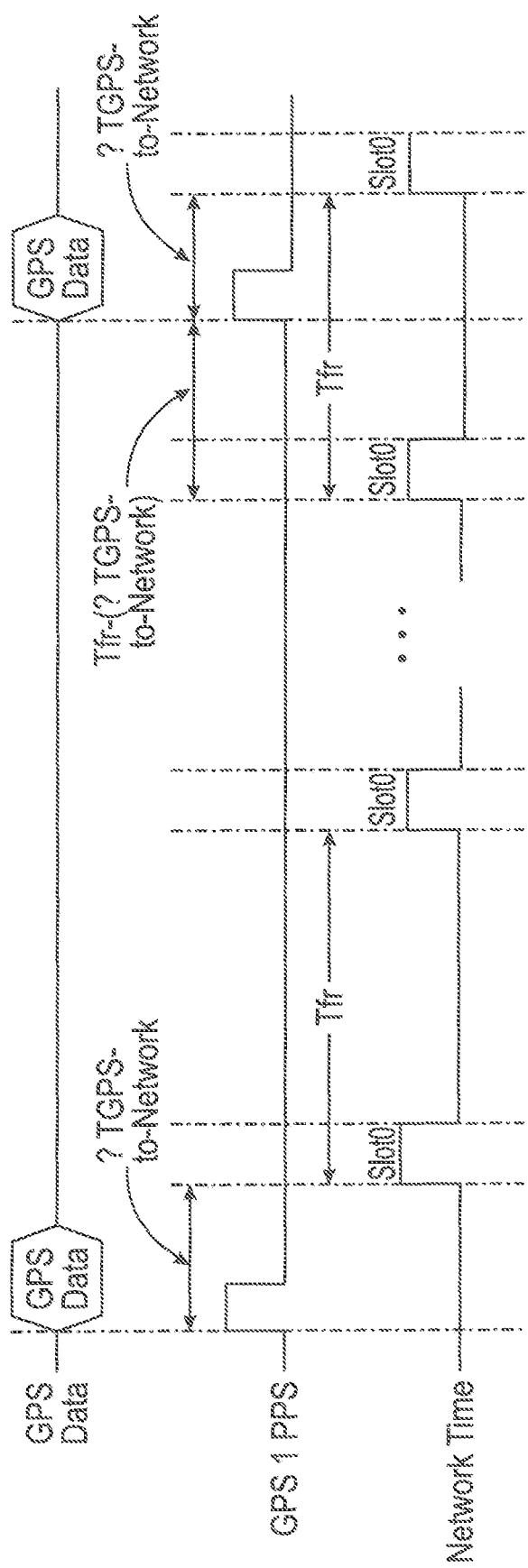
FIG. 5B is an exemplary timing diagram of the synchronization and time transfer system of FIG. 5A in accordance with one aspect of the present application.

Referring to FIG. 5A-5B, operation of one embodiment of the present invention may be disclosed. In this embodiment, the coordinator node 12 may be coupled to a GPS receiver 16B. The GPS receiver 16B may be used to establish a local time for the system 10 by sending a clock signal to the coordinator node 12. The GPS receiver 16B may send a timing message at predetermined intervals to the coordinator node 12. In accordance with one embodiment, the predetermined time period may be defined as frame time, Tf.

In the present embodiment, the GPS receiver 16B may send GPS data, GPS reference timing message, to the coordinator node 12 at GPS1 PPS. The pulse signal from the GPS receiver 16B causes a clock trigger 50 of the coordinator node 12 to signal a processor 52 to store the GPS reference timing message in the processor 52 or memory 54. The processor 52 may compute a time difference, ΔTGPS-to-Network, which is the time difference between when the GPS receiver sends GPS reference timing message at IPPS time and the network reference time (i.e., Slot 0 time, Frame time, Tfr). A transmitter/receiver 56 of the coordinator node 14 may send, via network wireless message transfer protocol, the calculated ΔTGPS-to-Network time and GPS reference timing message to the wireless nodes 14 (i.e., Node 1 to Node X).

Each of the wireless nodes 14 may process the data sent by the coordinator node 12 in the following manner. The wireless node 14 may establish network synchronization with the coordinator node 14 obtaining Slot time and Frame time, Tfr from the GPS reference timing message. The GPS reference timing message may further have the ΔTGPS-to-Network information from Coordinator Node 14 via wireless message transfer protocol. The wireless node 12 may compute 1 PPS pulse from the network reference time, Tfr and slot times and ΔTGPS-to-Network information. The wireless node 14 may output 1 PPS pulse and GPS time message for use in its application.

Upon the synchronization between the coordinator node 12 and the wireless node 14, to enhance the network timing synchronization one may remove the over-the-air transport time, RF Range Delay. To remove the over-the-air-transport time, the coordinator node 12 and the wireless nodes 14 may perform a ranging function to determine the time delay between the sending and receiving of data between wireless nodes in the same manner as disclosed above.

The foregoing description is illustrative of particular embodiments of the application, but is not meant to be a limitation upon the practice thereof. The following claims, including all equivalents thereof, are intended to define the scope of the application.

What is claimed is:

1. A method for synchronization and time transfer in a wireless system having a single timing source comprising:
    transmitting a timing message from a coordinator node, wherein the coordinator node is coupled to the single timing source of the wireless system;
    detecting the timing message by a wireless node;
    synchronizing the wireless node to a time on the timing message;

computing a delay time by the wireless node detecting the timing message, wherein the delay time is a time from when the wireless node detects the timing message to a next time slot;

determining a frame time by the wireless node, wherein the frame time is a time between when the timing message is sent and a next timing message is sent, the frame time comprising a plurality of time slots, each time slot being of a same duration; and counting down to the next timing message by the wireless node once the frame time is determined to maintain a local system time and be synchronized with the coordinator node.

2. The method of claim 1, comprising transmitting timing messages at a beginning of every frame time by the coordinator node.

3. The method of claim 1, determining a transmit time between the coordinator node and the wireless node.

4. The method of claim 3, wherein the transmit time is determined through Radio Frequency (RF) ranging.

5. The method of claim 3, wherein determining the transmit time comprises:

sending a range request data package from the coordinator node at a time T0 to the wireless node;

recording the time R0 when the range request data package has been received by the wireless node;

sending a data package with the time R0 by the wireless node to the coordinator node at a recorded time T1;

recording a time R1 when the data package with the time R0 has been received by the coordinator node;

sending a data package with the time T0, R0, R1 by the coordinator node to the wireless node at a time T2;

recording a time R2 when the data package with the data package of the times T0, R0, R1 has been received by the wireless node;

sending a data package with the time T0, T1, R0, R1, R2 by the wireless node to the coordinator node at a time T3;

recording a time R3 when the data package with the times T0, T1, R0, R1, R2 has been received by the coordinator node;

computing the time delay by the coordinator node.

6. The method of claim 5, comprising sending a data package with the transit time from the coordinator node to the wireless node.

7. The method of claim 5, wherein the coordinator node computes the transit time using the formula:

$$\text{Time Delay} = \frac{\frac{(R1-T0)-(T1-R0)}{2} + \frac{(R2-T1)-(T2-R1)}{2}}{2}.$$

8. The method of claim 1, comprising:

transmitting clock data from the single timing source to the coordinator node.

9. A method for synchronization and time transfer in a wireless system having a single timing source comprising:

transmitting timing messages at a predetermined time interval by a coordinator node, wherein a time between timing messages is defined as a frame time, the frame time comprising a plurality of time slots, each time slot being of a same duration, wherein the coordinator node is coupled to the single timing source;

detecting a first valid timing message sent by the coordinator node by a wireless node remote from the coordinator node;

synchronizing the wireless node to a time on the valid timing message;

computing a delay time by the wireless node detecting the timing message, wherein the delay time is a time from when the wireless node detects the timing message to a next time slot;

determining a frame time by the wireless node, wherein the frame time is a time between when the timing message is sent and a next timing message is sent, the frame time comprising a plurality of time slots, each time slot being of a same duration; and counting down to the next timing message by the wireless node once the frame time is determined to maintain a local system time and be synchronized with the coordinator node.

10. The method of claim 9, determining a transmit time between the coordinator node and the wireless node.

11. The method of claim 9, wherein determining the transmit time comprises:

sending a range request data package from the coordinator node at a time T0 to the wireless node;

recording the time R0 when the range request data package has been received by the wireless node;

sending a data package with the time R0 by the wireless node to the coordinator node at a recorded time T1;

recording a time R1 when the data package with the time R0 has been received by the coordinator node;

sending a data package with the time T0, R0, R1 by the coordinator node to the wireless node at a time T2;

recording a time R2 when the data package with the data package of the times T0, R0, R1 has been received by the wireless node;

sending a data package with the time T0, T1, R0, R1, R2 by the wireless node to the coordinator node at a time T3;

recording a time R3 when the data package with the times T0, T1, R0, R1, R2 has been received by the coordinator node;

computing the time delay by the coordinator node.

12. The method of claim 10, comprising sending a data package with the transit time from the coordinator node to the wireless node.

13. The method of claim 11, wherein the coordinator node computes the transit time using the formula:

$$\text{Time Delay} = \frac{\frac{(R1-T0)-(T1-R0)}{2} + \frac{(R2-T1)-(T2-R1)}{2}}{2}.$$

14. The method of claim 9, wherein the coordinator node and the wireless node operate in a 3 GHz to 6 GHz frequency range.

15. A wireless node system comprising:

a coordinator node coupled to a single timing source of the wireless node system, the coordinator node transmitting timing messages at a predetermined time interval, wherein a time between timing messages is defined as a frame time, the frame time comprising a plurality of time slots, each time slot being of a same duration, wherein the coordinator node is coupled to the single timing source; and a plurality of wireless nodes in wireless communication with the coordinator node, wherein each of the plurality of wireless nodes detect a first valid timing message sent by the coordinator and synchronize to a time on the valid timing message;

wherein each of the wireless nodes computes a delay time, wherein the delay time is a time from when each of the wireless nodes detects the valid timing message to a next time slot;

wherein each of the wireless nodes determines a frame time, wherein the frame time is a time between when the timing message is sent and a next timing message is sent, the frame time comprising a plurality of time slots, each time slot being of a same duration; and wherein each wireless node count down to the next timing message once the frame time is determined to maintain a local system time and be synchronized with the coordinator node.

16. The wireless node system of claim 15, wherein the coordinator node calculates a transmit time between the coordinator node and each of the plurality of wireless nodes.

17. The wireless node system of claim 16, wherein the coordinator node and each of the plurality of wireless nodes operate in a 3 GHz to 6 GHz frequency range.

* * * * *